United States Patent [19]

Sowards

[11] Patent Number: 4,963,041
[45] Date of Patent: Oct. 16, 1990

[54] BEARING MOUNTING WITH SELF-COMPENSATION FOR THERMAL EXPANSION

[75] Inventor: Brian D. Sowards, Mocksville, N.C.

[73] Assignee: Ingersoll-Rand Company, Woodcliff Lake, N.J.

[21] Appl. No.: 415,786

[22] Filed: Oct. 2, 1989

[51] Int. Cl.$^5$ .................. F16C 19/49; F16C 25/00
[52] U.S. Cl. .................. 384/493; 384/517; 384/620; 384/454
[58] Field of Search .................. 384/452–455, 384/493, 494, 517, 518, 537, 563, 571, 605, 618, 619, 620

[56] References Cited

U.S. PATENT DOCUMENTS

| | | |
|---|---|---|
| 2,324,676 | 7/1943 | Butterfield . |
| 2,345,952 | 4/1944 | Smith . |
| 2,387,105 | 10/1945 | Yager .................. 384/518 |
| 2,712,480 | 7/1955 | Synek .................. 384/620 X |
| 2,924,424 | 2/1960 | Titterington . |
| 3,311,431 | 3/1967 | Hilliard .................. 384/557 X |
| 3,429,224 | 2/1969 | Osburn . |
| 4,626,111 | 12/1986 | Swasey et al. .................. 384/557 X |
| 4,730,995 | 3/1988 | Dewhirst .................. 384/517 X |

FOREIGN PATENT DOCUMENTS 487595  10/1952  Canada .................. 384/454

Primary Examiner—Thomas R. Hannon
Attorney, Agent, or Firm—James R. Bell

[57] ABSTRACT

A bearing mounting with self-compensation for thermal expansion. A rotor is mounted in a housing by way of a first bearing having an outer race mounted in the housing and an inner race mounted on the rotor. The inner and outer races are relatively axially movable. A second bearing is mounted on an end of the rotor. A resilient member maintains the inner race in engagement with the outer race in response to relative axial movement between the inner and outer races due to varying thermal expansion rates between the housing and the rotor.

13 Claims, 1 Drawing Sheet

BEARING MOUNTING WITH SELF-COMPENSATION FOR THERMAL EXPANSION

BACKGROUND OF THE INVENTION

This invention relates generally to a bearing mounting arrangement and more particularly to such a mounting with self compensation for thermal expansion.

Screw-type air compressors include meshing rotors, male and female, for the purpose of converting atmospheric air to pressurized air. This process applies axial and radial loads to the rotors. Radial bearings are used for mounting the rotors due to the ability of such bearings to handle these loads. Tight clearances are required to reduce leakage between the meshing rotors, especially at the end of the compressor which discharges the pressurized air.

A supercharger application utilizing the above-described meshing rotors includes gears which synchronize the rotation of the rotors. Tight clearances are also required for these synchronizing gears so that the rotors do not touch. Also, the radial bearings must run true, i.e. no axial or radial floating can be tolerated, under the influence of the axial and radial loads. This floating occurs where there is clearance between the bearing and its mounting boss on the housing or rotor.

In the supercharger application, weight is an important factor and therefore an aluminum housing is used to reduce weight. However, if the steel rotors (or rotor shafts) are placed in an aluminum housing, this introduces a problem of different coefficients of thermal expansion for the steel and aluminum materials. This can cause rotor discharge end clearance problems and the unwanted axial or radial floating, when a temperature change produces clearance around the bearing.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing mounting with self-compensation for thermal expansion including a housing having a rotor mounted therein. A first bearing rotatably mounts the rotor in the housing. The first bearing has an outer race which is mounted in the housing and an inner race mounted on the rotor and axially movable relative to the outer race. A second bearing is mounted on an end of the rotor. A resilient member maintains the inner race in engagement with the outer race during relative axial movement between the inner and outer races caused by varying thermal expansion rates between the housing and the rotor.

The foregoing and other aspects will become apparent from the following detailed description of the invention when considered in conjunction with the accompanying drawing figure. It is to be expressly understood, however, that the drawing figure is not intended as a definition of the invention but is for the purpose of illustration only.

BRIEF DESCRIPTION OF THE DRAWING FIGURE

In the drawing:

The Figure is a cross-sectional side view illustrating an embodiment of the present invention.

DETAILED DESCRIPTION

Figure 1:
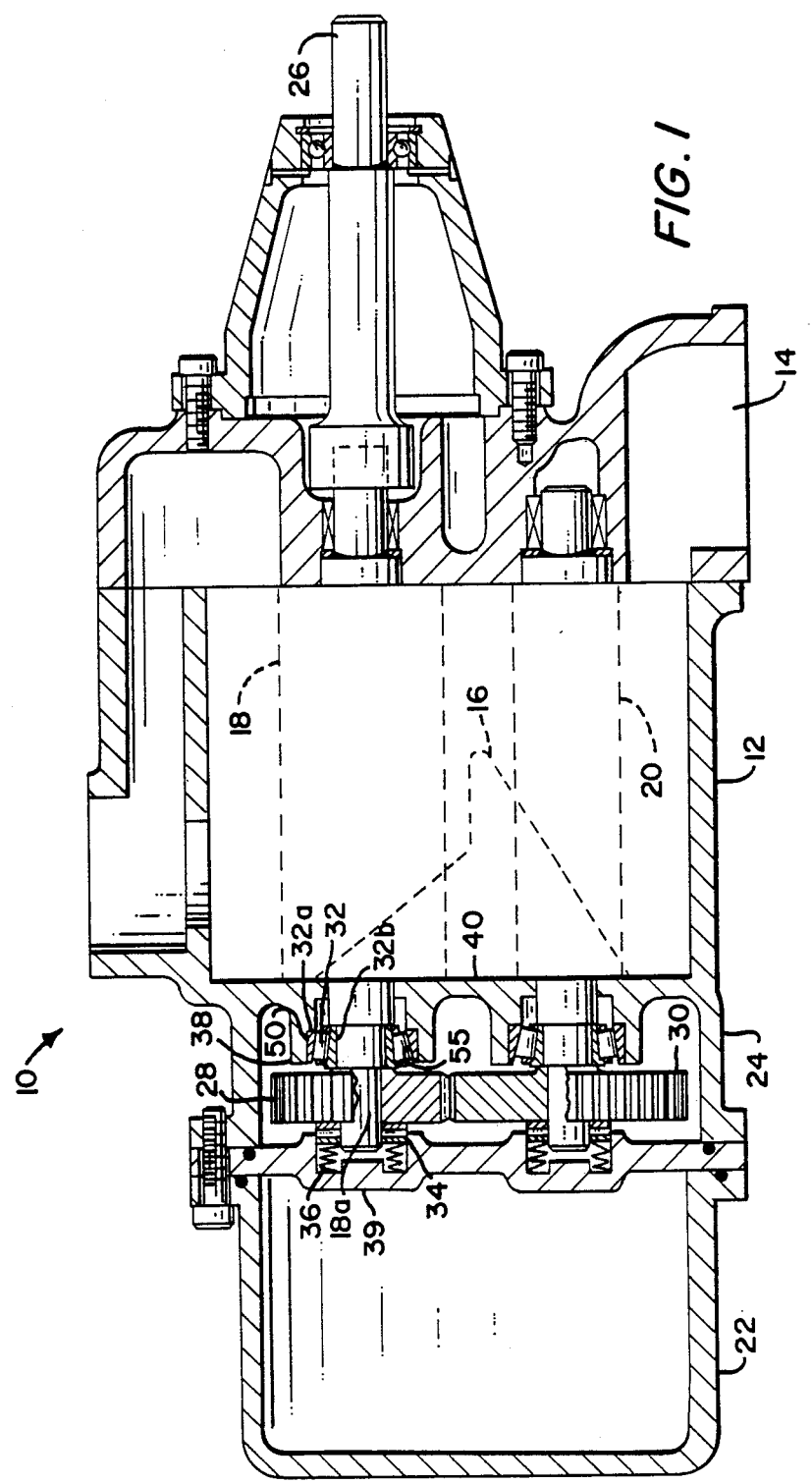

Referring now to the drawing Figure, a supercharger is generally designated 10 and comprises an aluminum housing 12, an inlet port 14, an outlet or discharge port 16, a pair of steel rotors (male 18 and female 20) and an oil reservoir 22 sealingly mounted at the outlet or discharge end 24 of housing 12. Male rotor 18 is belt driven at an end 26 and via a pair of meshed, synchronized gears 28, 30, drives female rotor 20.

Since the rotors 18, 20 are identically bearing mounted at the discharge end 24, only one of the bearing mountings will be fully described for brevity.

Rotor 18 includes a shaft 18a and is mounted in housing 12 by a first bearing means 32, a second bearing means 34 and a resilient means 36 adjacent discharge end 24.

First bearing means 32 is a steel tapered roller bearing having an outer race 32a including a tapered raceway 55 press fit into a boss 38 formed in housing 12, and an inner race 32b press fit onto rotor 18. The orientation of the tapered raceway 55 portion of the outer race 32a should be as shown in the Figure. This allows the bearing to accept thrust loading in the axial direction from the second bearing means 34 and from gas compression forces acting on the rotor 18. The press fit has enough interference to guarantee that no clearance between bearing and mounting boss occurs across the entire operational temperature range of the compressor. Gear 28 is mounted on rotor 18 in a conventional manner for rotation therewith. Second bearing means 34 is a well known thrust bearing conventionally mounted on rotor 18. Resilient means 36 comprises a pair of compression springs compressed between an end wall 39 of housing 12 and thrust bearing 34 for urging and maintaining inner race 32b in engagement with outer race 32a in response to relative axial movement between the inner and outer races 32b, 32a, respectively due to varying thermal expansion rates between the aluminum housing 12 and the steel rotor 18. Various spring arrangements and other combinations than that shown may be used to provide the desired load.

Upon initial startup of supercharger 10, the aluminum housing 12 heats up at a much faster rate than the steel rotor 18 and bearing 32. As the housing 12 heats up and grows or expands axially, it also grows or expands radially, as viewed in the Figure, on the outer diameter (O.D.) 50 of outer race 32a. Thus, the outer race 32a expands in diameter due to the press fit with housing 12. Rotor 18 is also growing axially, but at a different rate than the housing 12 thus undesirably closing up the discharge end clearance at an interface 40. Because the outer race 32a has a raceway 55 that is tapered in this bearing construction, the expansion of the boss 38 and outer race 32a radially will result in a relative movement of the inner race 32b in the axial direction due to the presence of engagement with the outer race 32a. This axial movement of the inner race 32b caused by the radial expansion on the outer race 32a offsets the difference in axial expansions of the housing 12 and the rotor 18, maintaining the discharge end clearance at its critical value. When the supercharger When the supercharger 10 is shut down, the process is reversed and the aluminum and steel cool at their respective rates. The aluminum will try to shrink the O.D. 50 of the outer race 32a. The O.D. shrinkage will cause an axial movement of inner race 32b relative to the outer race 32a that will compensate for the axial shrinkage differences of housing 12 and rotor 18, maintaining the discharge end clearance at its critical value. Due to the resilient means 36, forces acting on inner race 32b maintain inner race 32b and outer race 32a in engagement.

While this invention has been illustrated and described in accordance with a preferred embodiment, it is recognized that variations and changes may be made therein without departing from the invention as set forth in the claims.

What is claimed is:

1. A bearing mounting with self-compensation for thermal expansion comprising:
   a housing;
   a rotor mounted in the housing;
   first and second bearing means for rotatably mounting the rotor in the housing, and said first bearing means having an outer race mounted in the housing and an inner race mounted on the rotor and axially movable relative to the outer race, said second bearing means being mounted on an end of the rotor; and
   means for resiliently maintaining the inner race in engagement with the outer race during relative axial movement between the inner and outer races caused by varying thermal expansion rates between the housing and the rotor.

2. The bearing mounting as defined in claim 1, wherein the first bearing means is a tapered-roller bearing.

3. The bearing mounting as defined in claim 1, wherein the resilient means is urged against said second bearing means.

4. The bearing mounting as defined in claim 1, wherein the outer race is press fit into said housing.

5. The bearing mounting as defined in claim 4, wherein the inner race is press fit onto said rotor.

6. The bearing mounting as defined in claim 5, wherein the housing is of aluminum.

7. The bearing mounting as defined in claim 6, wherein the rotor includes a shaft and the rotor and shaft are of steel.

8. The bearing mounting as defined in claim 1, wherein the second bearing means is a thrust bearing mounted on said rotor.

9. The bearing mounting as defined in claim 8, wherein the resilient means is mounted in compression between an end of the housing and the thrust bearing.

10. The bearing mounting as defined in claim 9, including:
    a gear mounted on the rotor between the first and second bearing means.

11. A bearing mounting with self-compensation for thermal expansion comprising:
    a housing formed of a first material;
    a rotor formed of a second material different from the first material and mounted in the housing;
    first and second bearing means for rotatably mounting the rotor in the housing, said first bearing means having an outer race mounted in the housing and an inner race mounted on the rotor and axially movable relative to the outer race during a radial compression and expansion of said outer race, said outer race being press fit into the housing and said inner race being press fit onto said rotor said second bearing means mounted on an end of the rotor;
    a gear mounted on the rotor between the first and second bearing means; and
    means for resiliently maintaining the inner race in engagement with the outer race during relative axial movement between the inner and outer races caused by varying thermal expansion rates between the housing and the rotor materials.

12. A bearing mounting with self-compensation for thermal expansion comprising;
    a housing having an inlet end and an outlet end;
    a rotor mounted in the housing;
    first bearing means adjacent the outlet end for rotatably mounting the rotor in the housing, said first bearing means having an outer race mounted in the housing and an inner race mounted on said rotor and axially movable relative to said outer race as the outer race is radially compressed and expanded;
    second bearing means mounted on an end of the rotor adjacent the outlet end;
    a gear mounted on the rotor between first and second bearing means; and
    means for resiliently maintaining the inner race in engagement with the outer race in response to relative axial movement between the inner and outer races due to varying thermal expansion rates between the housing and the rotor.

13. A bearing mounting with self-compensation for thermal expansion comprising;
    a housing formed of a first material;
    a pair of rotors formed of a second material different from the first material and mounted side-by-side in the housing;
    first bearing means for rotatably mounting each rotor in the housing, each of said first bearing means having an outer race mounted in the housing and an inner race mounted on each rotor and axially movable relative to said outer race; second bearing means mounted on an end of each of the rotors;
    a gear mounted on each rotor, each gear being in meshed engagement with the other, each gear being mounted between the first and second bearing means; and
    means for resiliently maintaining each inner race in engagement with the respective outer race in response to relative axial movement between the inner and outer races due to varying thermal expansion rates between the housing and the rotor materials.

* * * * *